(12) United States Patent
Moon et al.

(10) Patent No.: US 9,196,934 B2
(45) Date of Patent: Nov. 24, 2015

(54) RADIANT HEAT PLATE FOR BATTERY CELL MODULE AND BATTERY CELL MODULE HAVING THE SAME

(71) Applicant: Hyundai Motor Company, Seoul (KR)

(72) Inventors: You Sung Moon, Gyeonggi-do (KR); Jin Woo Kwak, Gyeonggi-do (KR); Kyong Hwa Song, Seoul (KR)

(73) Assignee: Hyundai Motor Company, Seoul (KR)

( * ) Notice: Subject to any disclaimer, the term of this patent is extended or adjusted under 35 U.S.C. 154(b) by 73 days.

(21) Appl. No.: 13/676,410

(22) Filed: Nov. 14, 2012

(65) Prior Publication Data
US 2014/0045028 A1   Feb. 13, 2014

(30) Foreign Application Priority Data

Aug. 7, 2012 (KR) .......................... 10-2012-0086103

(51) Int. Cl.
*H01M 10/613* (2014.01)
*H01M 10/653* (2014.01)
*H01M 10/6551* (2014.01)

(52) U.S. Cl.
CPC ........ *H01M 10/5004* (2013.01); *H01M 10/613* (2015.04); *H01M 10/653* (2015.04); *H01M 10/6551* (2015.04); *Y02T 10/7005* (2013.01)

(58) Field of Classification Search
CPC ................................................. H01M 10/5004
USPC ........................................................ 429/120
See application file for complete search history.

(56) References Cited

U.S. PATENT DOCUMENTS

| | | | | |
|---|---|---|---|---|
| 2002/0061436 | A1* | 5/2002 | Inagaki et al. | 429/120 |
| 2003/0151868 | A1* | 8/2003 | Inae et al. | 361/88 |
| 2006/0246345 | A1* | 11/2006 | Yoon et al. | 429/62 |
| 2010/0261047 | A1* | 10/2010 | Kim et al. | 429/144 |
| 2011/0244299 | A1* | 10/2011 | Guener et al. | 429/120 |

(Continued)

FOREIGN PATENT DOCUMENTS

| KR | 20060102851 A | 9/2006 |
|---|---|---|
| KR | 10-2006-0110576 | 10/2006 |

(Continued)

OTHER PUBLICATIONS

English Translation of KR 10-2006-0134980.*

(Continued)

*Primary Examiner* — Milton I Cano
*Assistant Examiner* — Philip A Stuckey
(74) *Attorney, Agent, or Firm* — Mintz Levin Cohn Ferris Glovsky and Popeo, P.C.; Peter F. Corless

(57) ABSTRACT

Disclosed is a multifunctional radiant heat plate and a battery cell module having the same. The multifunctional radiant heat plate includes a heat conductive plate, a first and second composite sheet, at least one electroconductive metal layer, and electrodes. The heat conductive plate may be sandwiched between the first and second composite sheets. The at least one electroconductive metal layer is stacked on the composite sheet. Electrodes may be connected to the heat conductive plate and the metal layer, respectively. According to the disclosure, the heat conductive plate, the composite sheet, the electroconductive metal layer, and the electrodes are radiant heat interfacial components disposed between battery cells, and the composite sheet includes a piezoelectric material and a heat conductive filler dispersed and filled in a matrix resin.

10 Claims, 11 Drawing Sheets

(56) References Cited

U.S. PATENT DOCUMENTS

| | | | |
|---|---|---|---|
| 2011/0262792 A1* | 10/2011 | Lee et al. | 429/120 |
| 2011/0269009 A1* | 11/2011 | Tsutsumi et al. | 429/120 |
| 2012/0107662 A1* | 5/2012 | Rommler et al. | 429/120 |
| 2012/0286719 A1* | 11/2012 | Lee et al. | 320/103 |
| 2013/0209858 A1* | 8/2013 | Schmitt et al. | 429/120 |
| 2013/0216892 A1* | 8/2013 | Matsuura et al. | 429/144 |
| 2013/0252040 A1* | 9/2013 | Kwak et al. | 429/62 |

FOREIGN PATENT DOCUMENTS

| | | | |
|---|---|---|---|
| KR | 10-0706653 | 4/2007 | |
| KR | 10-2008-0007693 | 1/2008 | |
| KR | 10-1139412 | 7/2010 | |
| KR | 10-2010-0109872 | 10/2010 | |
| WO | 2006/112639 A1 | 10/2006 | |
| WO | 2011/101391 A1 | 8/2011 | |
| WO | WO 2011/101391 A1 * | 8/2011 | H01M 10/0525 |

OTHER PUBLICATIONS

Additional bibliographic data for "English Translation of KR 10-2006-0134980" Park et al., Published Apr. 5, 2007 as KR 100706653 B1 retrieved Mar. 2014.*

* cited by examiner (a) PIEZOELECTRIC ACTUATOR (b) PIEZOELECTRIC SENSOR

RADIANT HEAT PLATE FOR BATTERY CELL MODULE AND BATTERY CELL MODULE HAVING THE SAME

CROSS-REFERENCE TO RELATED APPLICATION

This application claims under 35 U.S.C. §119(a) the benefit of Korean Patent Application No. 10-2012-0086103, filed Aug. 7, 2012, the entire contents of which are incorporated herein by reference.

BACKGROUND 1. (a) Technical Field

The present invention relates to a radiant heat plate for radiating heat from a battery cell module. More particularly, the present invention relates to a multifunctional radiant heat plate having a sensor function, a vibration control and battery stability control function, and an energy harvest function while effectively radiating heat accumulated in a battery cell and module.

2. (b) Background Art

Generally, local temperature differences and undesired high heat may occur in batteries for electric vehicles due to the heat generated by high-output, high-speed, and repetition of battery charging and discharging. This causes thermal runaway, which hinders the efficiency and stability of batteries. Thermal runaway refers to a condition in which an increase in temperature creates a local environmental change that leads to a further increase in temperature (e.g., a positive temperature feedback loop), and may result from a deficiency in the ability of a battery to effectively radiate and diffuse generated heat to the outside environment.

Lithium ion batteries with a cell working voltage of about 3.6 V or higher have been used as power sources for portable electronics, and also as a power sources for eco-friendly vehicles such as high-power Hybrid Electric Vehicles (HEV) or pure Electric Vehicles (EV) by allowing a plurality of cells to be connected in series to each other. The lithium ion batteries have a working voltage three times higher than that of nickel-cadmium batteries or nickel-metal hybrid batteries, and have a better energy density per unit weight.

Lithium ion batteries can be manufactured in various types. For example, a pouched type of battery cell (e.g., a pouch cell) that has a flexible case is widely used, and because the a pouch cell has flexibility in its case, it has a great deal of formability with respect to its shape.

The pouched type of battery cells includes a battery part and a pouched type of case having a space for receiving the battery part. The battery part includes an anode plate, a separator, and a cathode plate which are sequentially disposed and wound in one direction, or includes a plurality of anode plates, separators, and cathode plates which are stacked in a multi-layered structure.

FIG. 1 is a view illustrating a cell module 10 having a plurality of pouched type cells 11 stacked therein. As shown in FIG. 1, adjacent cells 11 are mutually connected to each other through an electrode part 12. The cells 11 are spaced from each other by a certain interval, e.g., 3 mm or more. This interval serves as a channel space 13 between the cells 11 through which cooling air passes. Cooling air passes through the channel space 13 between cells 11 to allow heat of cells 11 to be discharged to the outside (the arrow of FIG. 1 represents the traveling direction of cooling air).

The pouched type of battery cells may vary in their volume due to intercalation/deintercalation of lithium ions to/from an electrode material during charging/discharging. Also, since damage of the separator may occur due to expansion of the electrode plate in the battery cell, and may generate internal resistance, increase voltage, and reduce final battery capacity, a radiant heat interfacial member (member disposed between battery cells) for dealing with the volume expansion of the battery is needed.

Additionally, when the volume of the cell in a typical battery system increases, a channel space formed between cells in the unit of a battery pack decreases in size, which reduces the ability to cool the battery. Accordingly, heat generation between battery cells due to the temperature rise of adjacent battery cells is accelerated, causing a rapid reduction in battery performance. In addition, when the volume of expansion of the battery cell is severe, the pouched type of case (e.g., formed of a polymer material) may be damaged, resulting in electrolyte and gas leakage from the inside of the battery. Furthermore, since the battery cell module and pack are structured by stacking pouched cells, the volume expansion of the cell or the gas leakage or explosion may directly damage adjacent cells.

Accordingly, in order to achieve a compact battery radiant heat system for improving energy density versus volume, the elasticity and the heat radiation performance of a material capable of dealing with the volume variation of the battery cell needs to be sufficient.

Typical battery cases and housing materials in which 20 to 30 wt % mineral filler, i.e., an incombustible filler is filled in a plastic matrix such as PC+ABS, PA, and PP, have functions such as frame resistance, chemical resistance, insulation characteristics, and durability, however, they have no heat radiation characteristics.

A radiant heat material under development focuses on the reduction of the interfacial reduction and improvement in the heat transfer characteristics through the increase of the contact surface between fillers that are highly filled. Also, in the case of a plastic-based radiant heat composite material, there is a limitation in effectively radiating heat generated in the pouched type of battery due to low heat conduction anisotropy and low heat conductivity.

Also, in a typical air cooling type of a cell module 10, since an air channel (channel space) 13 has to be maintained at a certain interval, e.g., 3 mm or more, the energy density per unit volume is difficult to improve. In other words, since the cells 11 are maintained at a certain interval when the battery cell module 10 having a certain volume is configured, there is a limitation in increasing the number of cells. Also, when the number of cells increases, the volume of the module 10 rapidly increases due to the thickness of cell and the interval between cells.

Thus, there is a need for an improved design for heat radiation of the battery cell module and development of a material optimized to the improved design.

A method of using a radiant heat plate between cells to reduce the size of batteries and improve the cooling effect has been recently proposed. This radiant heat plate has a configuration in which a flexible elastomer polymer material having high heat conduction efficiency is coated on an aluminum plate. This radiant heat plate provides an advantage that can maximize the contact surface with cells using the elasticity of the material. Also, when the radiant heat plate is used, air channels between cells can be omitted, enabling more cells to be disposed in one battery pack, and reducing the size of the battery in the same power. Also, the radiant heat plate shows higher heat radiation performance than existing designs. However, the radiant heat plate provides only a simple heat radiation function. Accordingly, the radiant heat plate needs to be equipped with various subsidiary devices in order to provide the stability of the battery, NVH performance and other performances. This causes an increase in the manufacturing cost and the weight of the battery, and makes it very difficult to provide the desired functions in view of the available space and battery environment.

A high voltage battery is being widely used for various apparatuses requiring high power due to today's environmental issues. It is desirable to provide subsidiary functions such as a vibration control and battery stability control function, a sensor function, and an energy harvest function (energy conversion function) in addition to the heat radiation function, the stability, and the durability to the battery. Thus, in order to solve the above-mentioned limitations, there is a need for the development of a radiant heat material for a battery that can perform various complex functions.

SUMMARY OF THE DISCLOSURE

To solve the foregoing problems, the present invention provides a multifunctional radiant heat plate having additional functions such as a sensor function, a vibration control and battery stability control function, and an energy harvest function while effectively radiating heat accumulated in a battery cell and module.

In one aspect, the present invention provides a multifunctional radiant heat plate for a battery cell module, including: a heat conductive plate; a composite sheet stacked on both surfaces of the heat conductive plate; an electroconductive metal layer stacked on the composite sheet; and electrodes connected to the heat conductive plate and the metal layer, respectively, wherein the heat conductive plate, the composite sheet, the electroconductive metal layer, and the electrodes are radiant heat interfacial components disposed between battery cells, and the composite sheet includes a piezoelectric material and a heat conductive filler dispersed and filled in a matrix resin.

In an exemplary embodiment, the composite sheet may include about 20 wt % to about 45 wt % piezoelectric material, about 20 wt % to about 45 wt % heat conductive filler, and about 35 wt % to about 60 wt % matrix resin.

In another exemplary embodiment, the matrix resin may include thermoplastic elastomer resin having elasticity.

In still another exemplary embodiment, the thermoplastic elastomer resin may include thermoplastic polyurethane (TPU) or styrene-ethylene-butylene-styrene (SEBS).

In yet another exemplary embodiment, the heat conductive filler may include one or more selected from the group consisting of graphite, carbon black, boron nitride, carbon fiber, silicon carbide, and aluminum nitride.

In still yet another exemplary embodiment, the piezoelectric material may include polyvinylidene fluoride (PVDF).

In a further exemplary embodiment, the heat conductive plate may have a thickness of about 1 mm or less, and the composite sheet may have a thickness of about 0.5 mm or less.

In another further exemplary embodiment, the composite sheet may be stacked on the heat conductive plate such that the heat conductive plate is exposed at an end portion thereof on which the composite sheet is not stacked.

In another aspect, the present invention provides a battery cell module including the multifunctional radiant heat plate described above, wherein the multifunctional radiant heat plate is interposed between adjacent battery cells such that composite sheets on both surface thereof contact the surfaces of the battery cells.

In an exemplary embodiment, the multifunctional radiant heat plate may include a heat conductive plate laterally protruding from the battery cells at an end portion thereof on which a composite sheet is not stacked.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated by the accompanying drawings, which are given hereinbelow by way of illustration only, and thus are not limitative of the present invention, and wherein.

Figure 1:
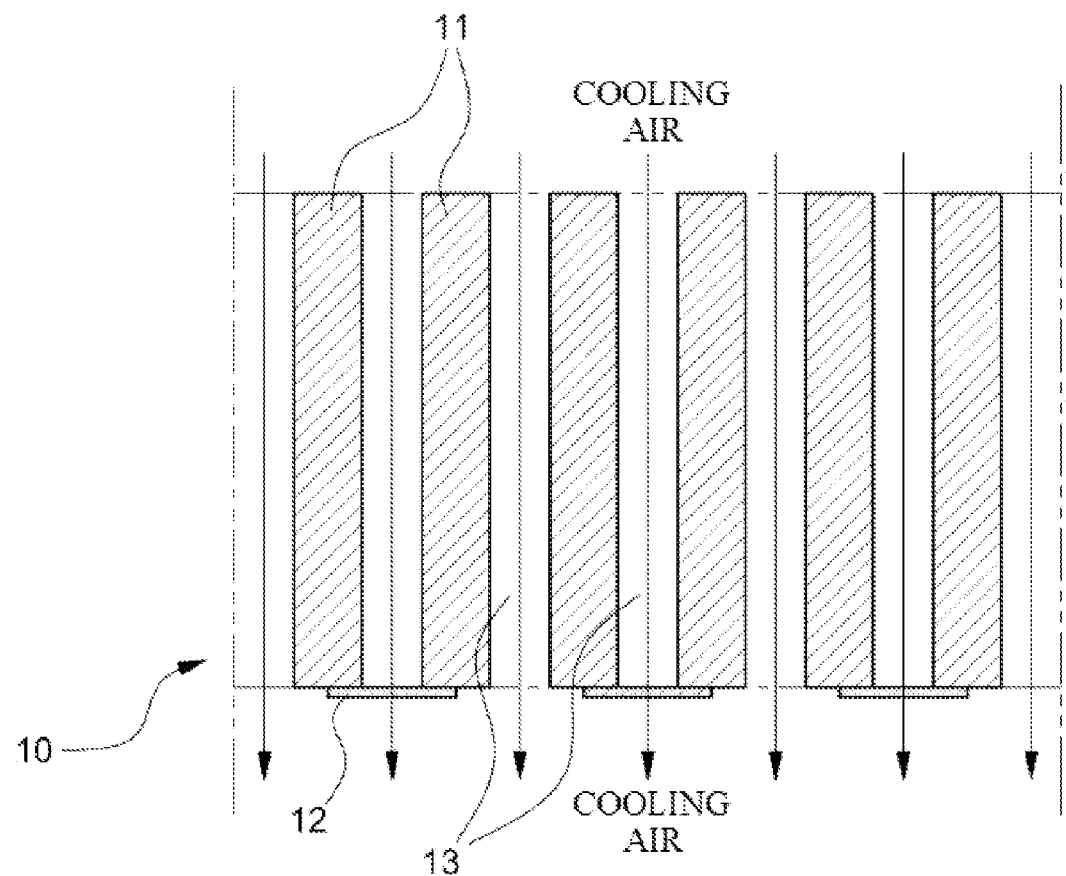
FIG. 1 is a view illustrating a conventional cell module having a plurality of pouched type cells stacked therein.

Reference numerals set forth in the Drawings includes reference to the following elements as further discussed below:

| 11: battery cell | 20: radiant heat plate |
|---|---|
| 21: heat conductive plate (aluminum plate) | |
| 22: composite sheet | 23: matrix resin |
| 24: piezoelectric material (PVDF) | 25: heat conductive filler (graphite) |
| 26, 28: electrode | 27: metal layer (metal powder coating layer) |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Ranges provided herein are understood to be shorthand for all of the values within the range. For example, a range of 1 to 50 is understood to include any number, combination of numbers, or sub-range from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in detail with reference to the accompanying drawings so that those skilled in the art can easily carry out the present invention.

The present invention relates to a multifunctional radiant heat plate and a battery cell module having the multifunctional radiant heat plate, which can provide an effective radiant heat function (e.g., dissipating heat), an energy harvest function (e.g., producing electrical energy) that converts thermal energy generated in a battery into electric energy, a sensor function (e.g., a self-diagnosis function) for measuring the lifespan of, and/or damage to, the battery, a sensor function for measuring the vibration and the exciting force applied to the battery, and a vibration control and battery stability control function.

The radiant heat plate may be a heat controlling component of a battery cell module, and may be an interfacial component for heat radiation disposed between, for example, pouched type battery cells. The radiant heat plate may be usefully applied to batteries of eco-friendly vehicles such as Hybrid Electric Vehicles (HEV), pure Electric Vehicles (EV), and Fuel Cell Electric Vehicles (FCEV). Also, the radiant heat plate may be configured with materials and structures that can effectively radiate heat generated in each cell to increase the lifespan and stability of the battery cell module.

Additionally, the radiant heat plate may have a configuration that can maximize the radiant heat characteristics using materials having excellent thermal conductivity. Since the radiant heat plate may be an interfacial component interposed between battery cells, the radiant heat plate may have features capable of dealing with the volume variation (expansion/contraction of cells) of the cells, as well as the ability to radiate heat. Accordingly, the radiant heat plate may be configured to have high elasticity (compression and resilience) to deal with the volume variation of the battery cells caused by charging and discharging.

Since the radiant heat plate is an interfacial component that directly contacts the battery cells, the radiant heat plate may be formed of materials (e.g., like the below-described elastomer) that can solve a limitation in surface smoothness with respect to cells and increase the adhesion and grip properties. The radiant heat plate may be configured to minimize the thermal resistance generated at an interface between the battery cell and the radiant heat plate.

FIGS. 2 through 5 are views illustrating a combination state of a multifunctional radiant heat plate and a cell according to an exemplary embodiment of the present invention.

Figure 2:
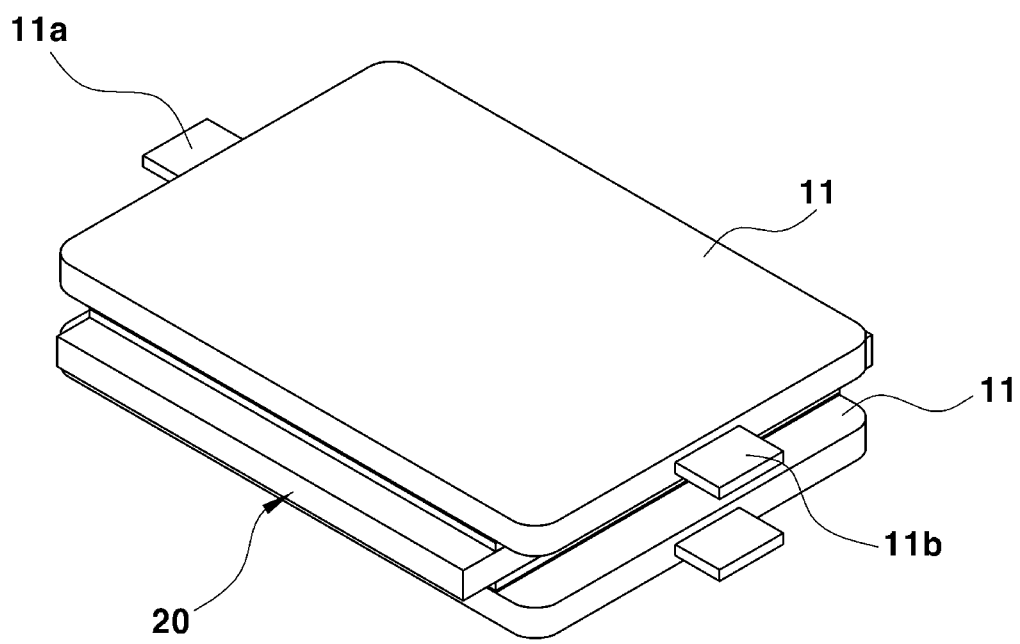
FIGS. 2 through 5 are views illustrating a combination state of a multifunctional radiant heat plate and a cell according to an exemplary embodiment of the present invention.
Figure 3:
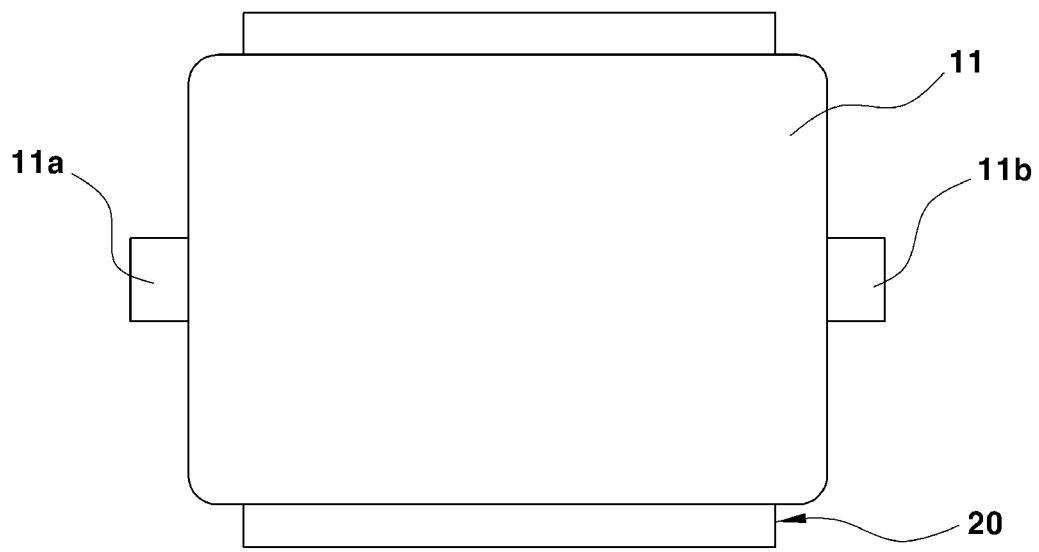
Figure 4:
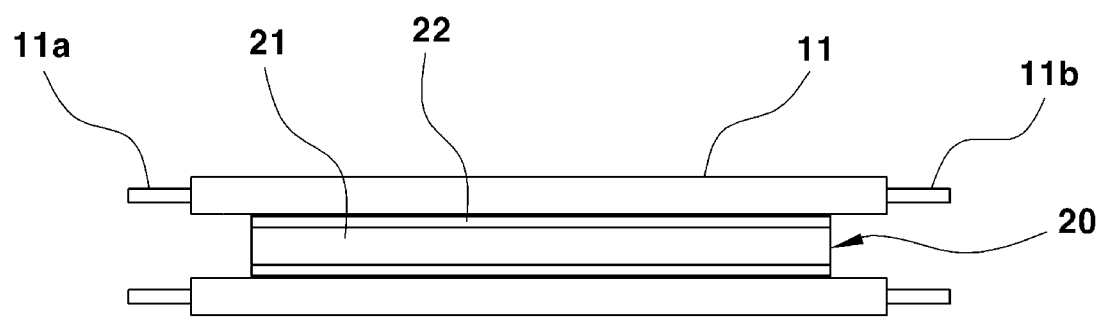
Figure 5:
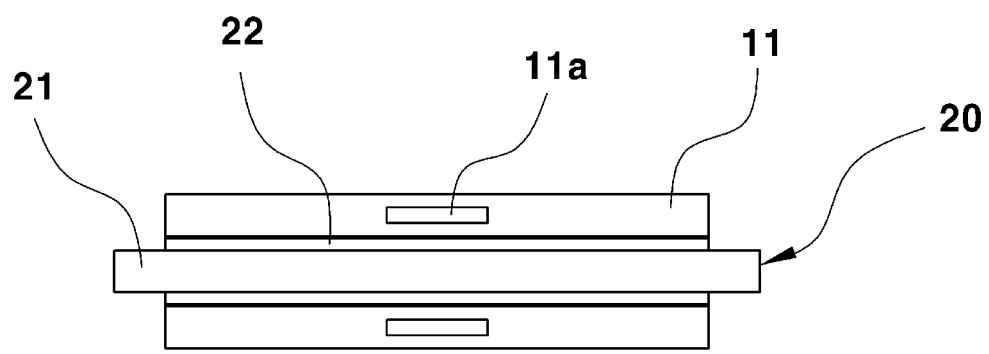
Figure 6:
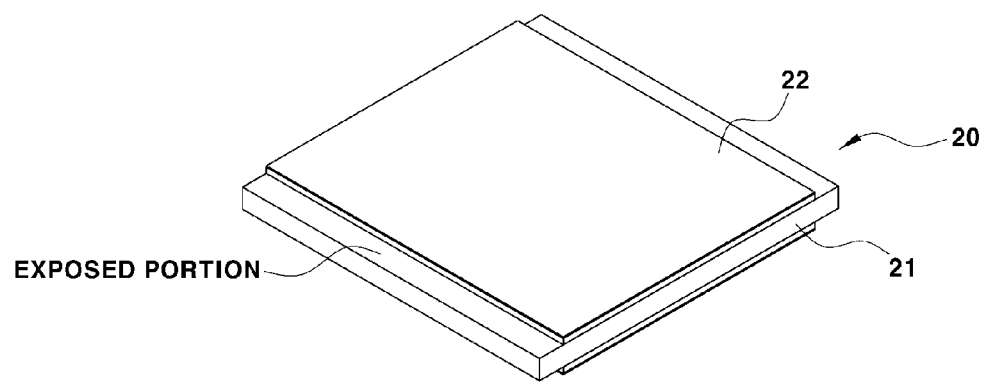
FIGS. 6 through 9 are views illustrating a multifunctional radiant heat plate according to an exemplary embodiment of the present invention.
Figure 7:
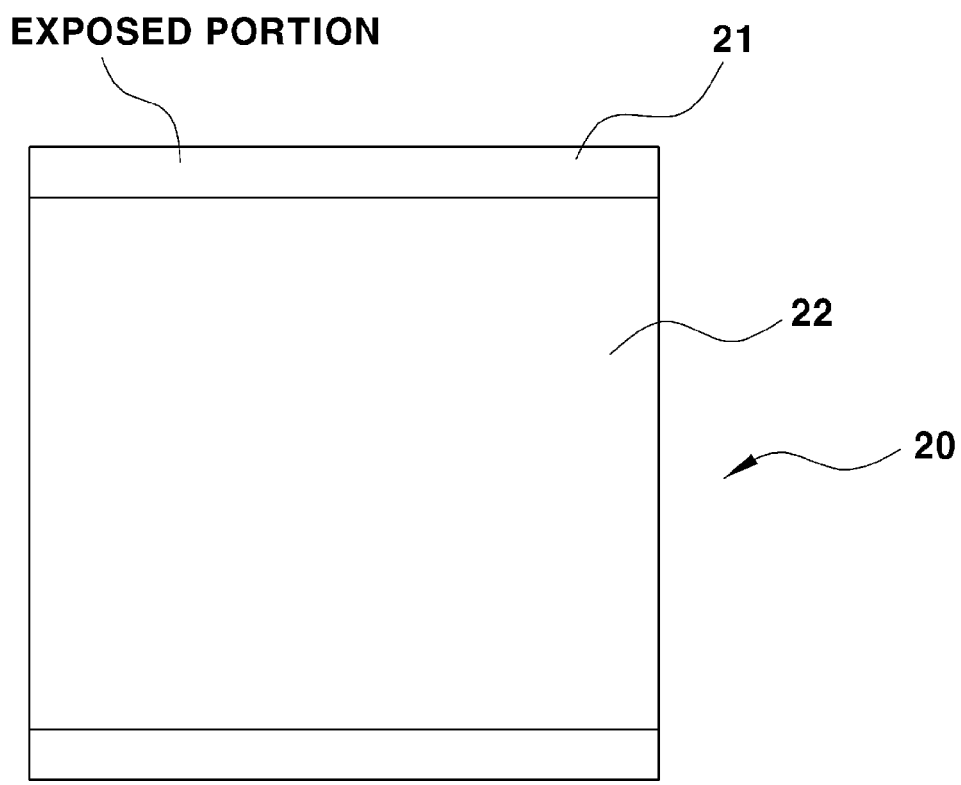
Figure 8:
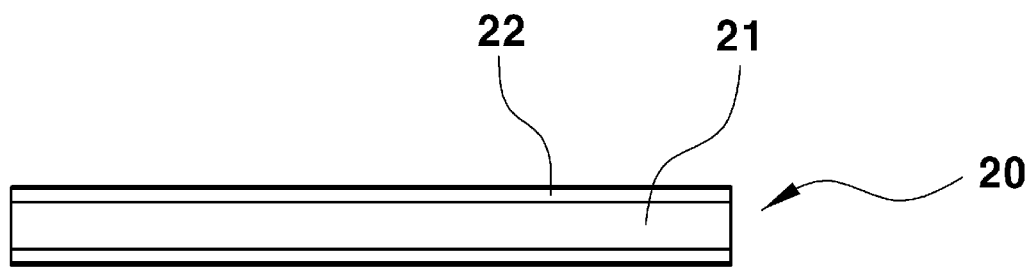

FIG. 2 depicts a pouched type of battery cells 11, 11', a positive electrode 11a, and a negative electrode 11b. Each pouched type of battery cells 11, 11' may be charged with electric energy or output electric energy. A radiant heat plate 20 may be disposed between two battery cells 11, 11'. The radiant heat plate 20 (interfacial component disposed for heat radiation between the battery cells) interposed between two battery cells 11, 11' may radiate heat generated in adjacent battery cells to cool the cells. Although it is exemplified in the drawings that one radiant heat plate 20 is disposed between two battery cells 11, 11', three or more cells and two or more radiant heat plates may be alternately stacked to form one battery cell module. The battery cell module may be configured such that one radiant heat plate is disposed between cells, respectively.

FIGS. 6 through 9 are views illustrating a multifunctional radiant heat plate according to an exemplary embodiment of the present invention.

As shown in the drawings, a multifunctional radiant heat plate 20 according to an exemplary embodiment of the present invention has a stacked structure in which composite sheets 22 are stacked on both surfaces of an aluminum plate 21 that is a heat conductive plate. Here, the composite sheet 22 may be a composite material having a film or sheet shape in which a piezoelectric material 24 and a heat conductive filler 25 are uniformly dispersed and filled in a matrix resin 23.

The matrix resin 23 may serve as a matrix that gives elasticity to the composite sheet 22 and binds the piezoelectric material 24 and the heat conductive filler 25. The piezoelectric material 24 may serve to generate a piezoelectric effect in the composite sheet 22, and the heat conductive filler 25 may serve to increase a heat transfer effect of the composite sheet 22.

The composite sheet 22 of the radiant heat plate 20 may cover a part of the aluminum plate 21 with the exception, for example, of a part of a certain width (e.g., about 15 mm) at one or both ends of the aluminum plate 21. As shown in FIG. 2, when stacked with the cell 11, the exposed part of the aluminum plate 21 that is not covered by the composite sheet 22 may laterally protrude from the cell 11. Accordingly, when contacting air, the aluminum plate 21 may be cooled.

The aluminum plate 21 of the radiant heat plate 20 may serve to radiate heat transferred from the cell 11 through the composite sheet 22 into air of the outside.

The matrix resin 23 of the composite sheet 22 may include thermoplastic elastomer (TPE) that can effectively deal with the volume expansion of the cell by having elasticity, while also improving the grip property with the cell 11.

Also, the TPE may include thermoplastic polyurethane (TPU) and styrene-ethylene-butylene-styrene (SEBS).

Also, the piezoelectric material 24 may include polyvinylidene fluoride (PVDF) that is well known as a polymer piezoelectric material. The heat conductive filler 25 that transmits heat into the composite sheet 22 may include one of graphite, carbon black, boron nitride, carbon fiber, silicon carbide, aluminum nitride, and a combination thereof.

The TPE-based matrix material of the composite sheet 22 may serve to widen the contact area between the cell 11 and the radiant heat plate 20 by providing an elastic force, and the heat conductive filler 25 may increase the radiant heat performance of the radiant heat plate 20.

Graphite having heat conductivity of about 100 W/mK to about 200 W/mK may be used. Also, an elastomer composite sheet that is filled with the heat conductive filler including graphite may have heat conductivity of about 10 W/mK or more.

The composite sheet 22 may include about 20 wt % to about 45 wt % piezoelectric material (PVDF), about 20 wt % to about 45 wt % heat conductive filler (graphite), and about 35 wt % to about 60 wt % matrix resin (TPU or SEBS). The piezoelectric material 24 and the heat conductive filler 25 that are internal constituents in the composite sheet 22 may be uniformly distributed at a high degree of dispersion in the matrix resin 23.

When the content of the polymer piezoelectric material in the composite sheet 22 exceeds about 45 wt %, the radiant heat effect and the elasticity may be undesirably reduced. Accordingly, the content of the polymer piezoelectric material needs to be appropriately adjusted within the scope for use described above according to the characteristics of the purpose for use.

Also, when the heat conductive filler 25 is filled below about 20 wt %, sufficient heat conductivity cannot be obtained. When the heat conductive filler 25 is filled beyond about 45 wt %, the elasticity, the grip property, and the adhesion property of the composite sheet 22 may be excessively reduced, which is undesirable.

The composite sheet 22 may have a thin thickness enough to perform effective heat transfer on the aluminum plate 21, and have an appropriate thickness to show elasticity for dealing with the improvement in grip property and the volume variation.

For this, the thickness of the aluminum plate 21 may be allowed to be equal to or smaller than about 1 mm, and the thickness of the composite sheet 22 stacked on the both surfaces of the aluminum plate 21 may be allowed to be equal to or smaller than about 0.5 mm. Since the thicknesses of the aluminum plate 21 and the composite sheet 22 affects the whole size of the battery, a smaller thickness is more advantageous.

Figure 9:
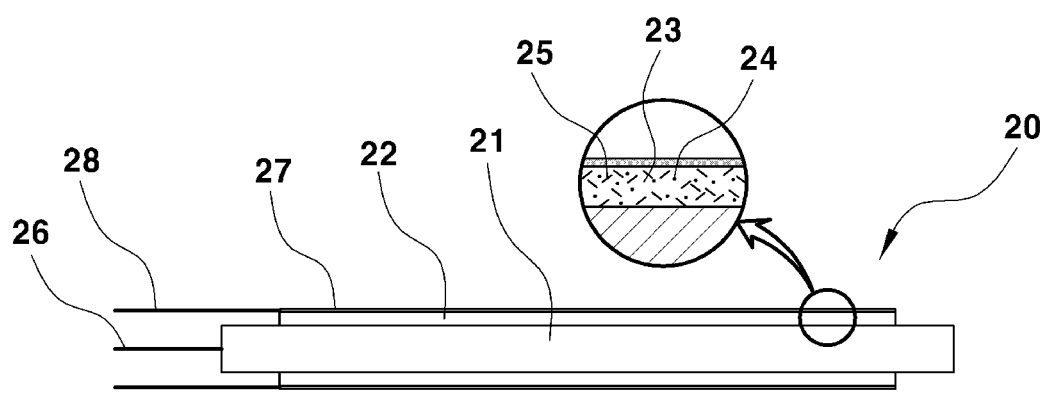

In the radiant heat plate 20 including the heat conductive aluminum plate 21 and the composite sheet 22, as shown in FIG. 9, a negative electrode 26 may be connected to the aluminum plate 21, and a positive electrode 28 may be connected to the metal layer 27 formed of an electroconductive material and stacked on the composite sheet 22. Here, the metal layer 27 may become a metal powder coating layer that is formed by coating metal powder on the surface part of the composite sheet. The positive electrode 28 connected to the metal powder coating layer 27 and the negative electrode 21 connected to the aluminum plate 21 may be used as piezoelectric electrodes, and may be disposed in a direction diagonal to the electrodes 11a and 11b of the cell 11.

The metal powder coating layer 27 may serve to electrically connect the whole of the material in order to generate the electrical characteristics of the piezoelectric material (PVDF) 24 in the composite sheet 22. The positive electrode 28 and the negative electrode 26 may serve as a passage of electric energy generated from the piezoelectric material 24 in the composite sheet 22 or applied from the outside.

The radiant heat plate 20 described above may be manufactured by pressing the composite sheet 22 including the piezoelectric material, the heat conductive filler, and the thermoplastic elastomer on the aluminum plate 21.

Thus, the radiant heat plate 20 may be interposed between the battery cells 11 to effectively deal with the volume variation of the battery cell and maintain the temperature of the whole battery at an appropriate temperature through effective heat radiation.

In a typical battery cell module, there is a limitation in design flexibility because pouched-type battery cells are generally arranged at a certain interval of about 3 mm to about 5 mm to form a channel for air cooling. However, in a battery cell module using the radiant heat plate 20 according to the embodiment of the present invention, since the interval between the cells 11 can be reduced to about 3 mm or less corresponding to the thickness of the radiant heat plate 20 without a separate channel space for air cooling, the energy density versus equal volume can be increased.

The battery cell module can effectively deal with the volume variation of the cells that occurs upon charging/discharging of the battery due to elasticity of the thermoplastic elastomer that is the matrix resin. Also, since the grip property and adhesion property of the elastomer material with respect to the cell (e.g., surface of cell case) are excellent, there is no interfacial gap with the cells. Accordingly, the heat of the cells may be effectively transferred to the aluminum plate through the elastomer composite sheet (or high heat conductive filler contained in the elastomer composite sheet), and then may be discharged to the outside.

In the radiant heat plate according to an exemplary embodiment of the present invention, the composite sheet containing the piezoelectric material (PVDF) may show the piezoelectric effect together with the radiant heat function. The radiant heat plate may provide various functions through the piezoelectric effect.

A piezoelectric material such as PVDF that is added in the composite sheet may convert kinetic energy into electrical energy, or may convert electrical energy into kinetic energy. The piezoelectric effect may be described to be shown through a mutual reaction of mechanical-electrical state in a material having a crystal structure.

When the mechanical change (compression/tension) is applied to the corresponding material, electrical signals may be generated. On the other hand, when electrical signals are applied to the corresponding material, a mechanical change may be generated. The former is called a primary piezoelectric effect, while the latter is called a secondary piezoelectric effect (or reverse piezoelectric effect), which means that kinetic energy and electrical energy can be mutually converted into one another.

Figure 10A:
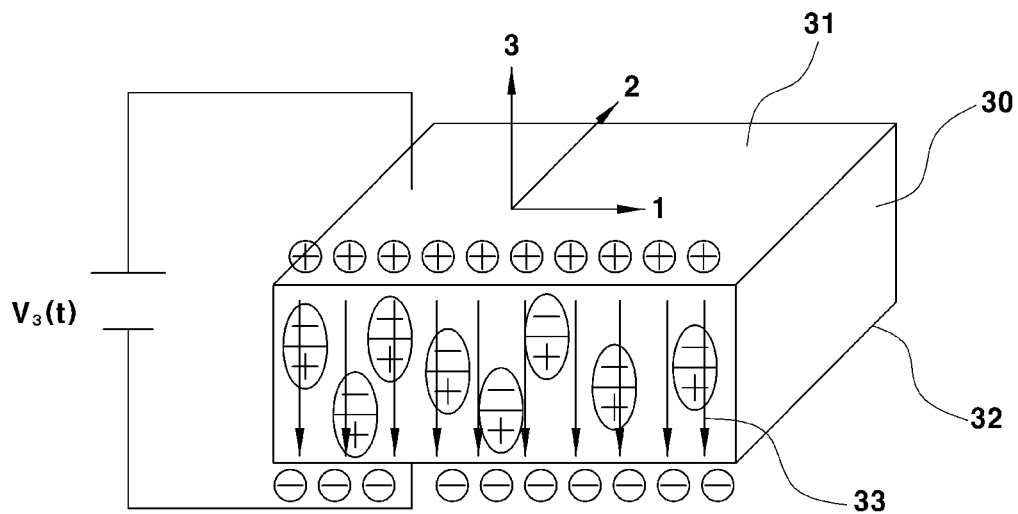
FIG. 10A-B is a view illustrating an actuator and a sensor using a piezoelectric element.
Figure 10B:
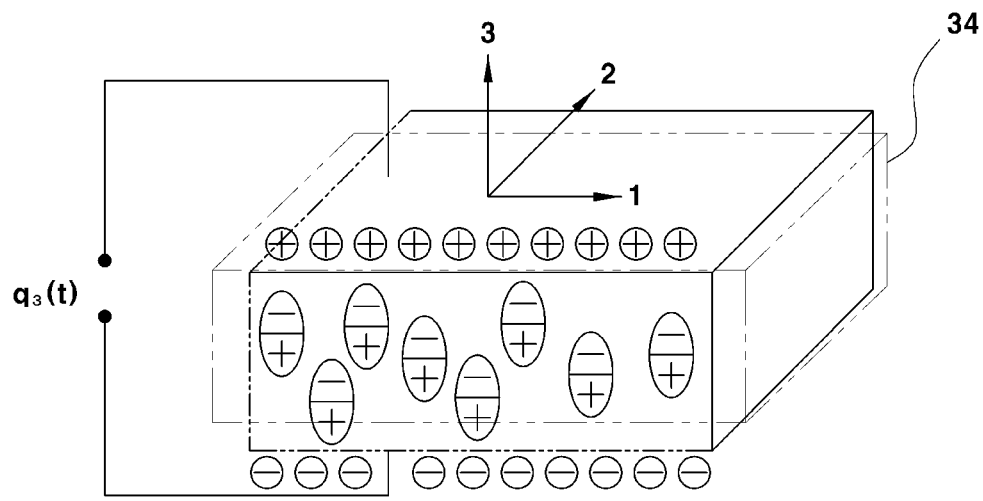
Figure 11:
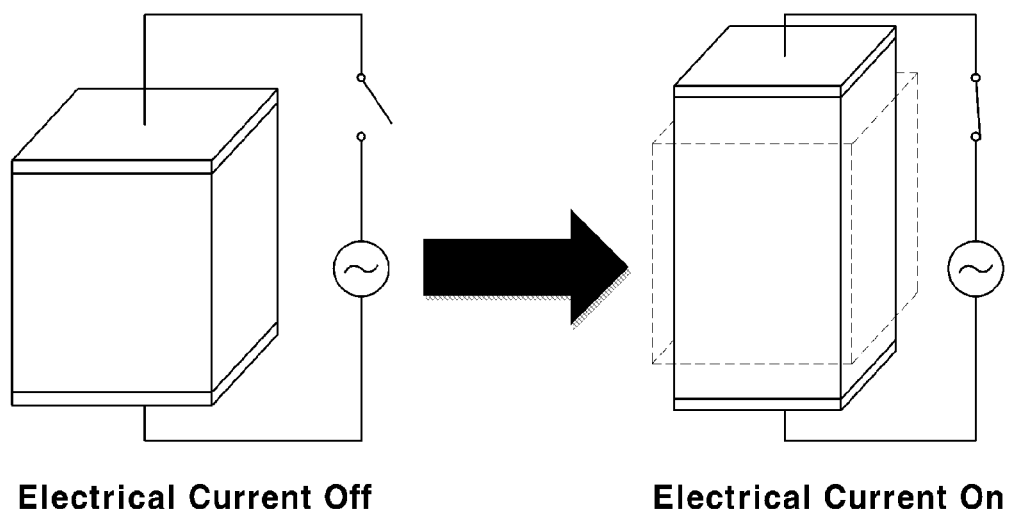
FIG. 11 is a view illustrating the driving principle of a piezoelectric element.

FIG. 10A-B is a view illustrating an actuator and a sensor using a piezoelectric element. FIG. 11 is a view illustrating the driving principle of a piezoelectric element.

As shown in FIG. 10A-B, a piezoelectric material 30, which is a material that generates a piezoelectric effect, may be formed of a material such as, for example, PVDF and PZT having an electric dipole. Upper and lower electrodes 31 and 32 may be connected to an upper part and a lower part of the piezoelectric material 30, respectively.

An electric field 33 may be formed when the electrodes 31 and 32 are charged to generate the secondary piezoelectric effect (reverse piezoelectric effect), and then negative and positive charges are arranged inside the piezoelectric material 30.

The reference numeral 34 indicates the shape of the piezoelectric material 30 before deformation. When a stress is applied to the piezoelectric material 30, the piezoelectric material 30 may be deformed, and may vary in electric characteristics according to the direction of the applied stress. Among materials having a crystal structure, there is a material having an electric dipole on the molecular structure or crystal lattice structure thereof. Generally, since the quantity of negative charges and the quantity of positive charges are equal to each other in nature, electric neutrality is shown. However, when viewed in terms of crystal structure, the locations of positive charges and negative charges may be slightly unbalanced, and an electric field may be formed by unit of atom or molecule. This is called "electric dipole".

When an external stress is applied to a material having an electric dipole, a state change of inter-molecule or inter-ion constituting a crystal may occur. From the macroscopic viewpoint, when a material is subject to a stress, the crystal structure may become unbalanced, and the electric dipole moment may change, causing the peripheral electric field to change.

From this principle, positive or negative electricity may be generated in an electric circuit connected to a piezoelectric element (e.g., a primary piezoelectric effect). On the other hand, when electricity is applied to the circuit of the piezoelectric element, the electric dipole may be changed by an external electric attractive force or repulsive force, and thus physical deformation may occur in the piezoelectric element, causing a reverse piezoelectric effect (e.g., a secondary piezoelectric effect).

In this exemplary embodiment, a PVDF material may be used, for example, as a piezoelectric material showing the piezoelectric effect, and may be mixed with heat conductive filler (graphite filler) and thermoplastic elastomer such as TPU or SEBS to manufacture the composite sheet 22. Thereafter, the composite sheet 22 may be stacked on the aluminum plate 21, and then the negative electrode 26 and the positive electrode 28 may be connected to the aluminum plate 21 and the electroconductive metal layer (metal powder coating layer) 27 of the composite sheet 22 to complete the radiant heat plate 20, respectively.

As described above, the heat conductive filler may be used to increase the radiant heat performance. The thermoplastic elastomer, which has slight elasticity, may be used to widen the contact area between the battery cell 11 and the radiant heat plate 20.

Heat generated by repeated charging/discharging of the battery cell 11 may be transferred to the composite sheet 22 of the radiant heat plate 20, and vibration of the crystal lattice due to the temperature rise of the composite sheet 22 may cause molecules to move.

This kinetic energy may be transferred to the piezoelectric material (PVDF material) of the composite sheet 22 to generate a stress, which causes the primary piezoelectric effect and a discharge of electric energy. In this case, heat energy that is not changed into electric energy may be discharged through the aluminum plate 21 that is a heat conductive plate.

As a result, since the radiant heat plate 20 converts heat energy discarded unlike in a typical radiant heat plate into electric energy that is a useful energy source, the energy regeneration or energy harvest function can be achieved.

Also, a sensor function for checking the lifespan and the stability of the battery cell 11 in real-time using the primary piezoelectric effect principle may be provided. Due to the expansion or the breakage of the cell 11, the PVDF material inside the composite sheet 22 may be subject to a stress, and the stress variation may be outputted as electrical signals through the electrodes.

When an apparatus that can inform a user of the breakage or the lifespan of the battery cell 11 upon occurrence of an abnormal signal is provided, a Condition Monitoring System (CMS) function can be achieved. Also, it becomes possible to collect data on internal vibration of the battery pack or vibration transmitted from the outside, and to perform NVH-related control and examination.

Also, when the radiant heat plate 20 is allowed to receive electrical signals from an external control unit through the electrodes 26 and 28 by the secondary piezoelectric effect (reverse piezoelectric effect) principle, a system of attenuating vibration and noise from inside or outside through active control may be configured.

In this case, the control unit may receive electrical signals of vibration and noise and send electrical signal of an antiphase condition to the electrodes 26 and 28 of the radiant heat plate 20. The PVDF material inside the composite sheet 22 that receives these electrical signals may vibrate at a specific frequency to offset the noise and vibration from inside or outside (serving as an exciter capable of performing NVH reduction control).

As a result, it is possible to secure the stability by maintaining a specific stress in consideration of the conditions of cell expansion using the above-mentioned functions (securing stability by controlling stress upon cell expansion), and the degree of freedom of building an additional control unit is very high.

Thus, since a multifunctional radiant heat plate according to an exemplary embodiment of the present invention has additional functions such as a sensor function, a vibration control and battery stability control function, and an energy harvest function while effectively radiating heat accumulated in a battery cell and module, additional devices disposed for various subsidiary functions may be omitted, and thus it is possible to achieve the simplification and reduction of components, the volume and weight reduction, the cost saving, and the provision of additional control functions.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A multifunctional radiant heat plate for a battery cell module, comprising:
   a heat conductive plate;
   first and second composite sheets each respectively stacked on one of two planar surfaces of the heat conductive plate;
   first and second electroconductive metal layers each respectively stacked on the first and second composite sheets; and
   a plurality of electrodes connected correspondingly to the heat conductive plate and the first and second electroconductive metal layers,
   wherein each of the first and second composite sheets comprise a matrix resin, a piezoelectric material and a heat conductive filler, and
   wherein the piezoelectric material and the heat conductive filler are dispersed in the matrix resin,
   wherein the piezoelectric material generates an electric energy when variation of volume of the battery cell occurs and the electrodes are used as piezoelectric electrodes that are connected to an upper part and a lower part of the piezoelectric material in the first and second composite sheets, such that the electrodes serve as a passage of the electric energy generated from the piezoelectric material, and the piezoelectric material serves as a sensor for checking lifespan and stability of the battery cell.

2. The multifunctional radiant heat plate of claim 1, wherein each of the first and second composite sheets includes about 20 wt % to about 45 wt % piezoelectric material, about 20 wt % to about 45 wt % heat conductive filler, and about 35 wt % to about 60 wt % matrix resin.

3. The multifunctional radiant heat plate of claim 1, wherein the matrix resin includes a thermoplastic elastomer resin.

4. The multifunctional radiant heat plate of claim 3, wherein the thermoplastic elastomer resin is selected from the group consisting of a thermoplastic polyurethane (TPU), a styrene-ethylene-butylene-styrene (SEBS), and any combination thereof.

5. The multifunctional radiant heat plate of claim 1, wherein the heat conductive filler is selected from the group consisting of graphite, carbon black, boron nitride, carbon fiber, silicon carbide, and aluminum nitride.

6. The multifunctional radiant heat plate of claim 1, wherein the piezoelectric material comprises polyvinylidene fluoride (PVDF).

7. The multifunctional radiant heat plate of claim 1, wherein the heat conductive plate has a thickness of about 1 mm or less, and the first and second composite sheets have a thickness of about 0.5 mm or less.

8. The multifunctional radiant heat plate of claim 1, wherein the first and second composite sheets are stacked on the two planar surfaces of the heat conductive plate such that an end portion of the heat conductive plate is exposed.

9. A battery cell module comprising a multifunctional radiant heat plate of claim 1, wherein the multifunctional radiant heat plate is interposed between adjacent battery cells such that composite sheets on both surfaces of the multifunctional radiant heat plate contact one or more surfaces of the battery cells.

10. The battery cell module of claim 9, wherein the multifunctional radiant heat plate includes a heat conductive plate laterally protruding from the battery cells such that an end portion of the heat conductive plate is exposed.

\* \* \* \* \*